United States Patent [19]

Prittie

[11] 4,236,955

[45] Dec. 2, 1980

[54] PRINTING AND DIE-CUTTING APPARATUS

[76] Inventor: Allan R. Prittie, 12 Blackdown Crescent, Islington, Ontario, Canada

[21] Appl. No.: 847,241

[22] Filed: Oct. 31, 1977

[30] Foreign Application Priority Data

Oct. 29, 1976 [CA] Canada ................................ 264629

[51] Int. Cl.[3] ......................... B26D 5/34; B32B 31/18

[52] U.S. Cl. ...................................... 156/353; 83/209; 83/371; 156/361; 156/378; 156/510; 156/543

[58] Field of Search ............... 156/361, 510, 521, 519, 156/378, 520, 513, 514, 384, 543, 64, 353, 528; 83/80, 209, 371

[56] References Cited

U.S. PATENT DOCUMENTS

| | | | |
|---|---|---|---|
| 2,304,787 | 12/1942 | Avery | 156/248 |
| 2,958,365 | 11/1960 | Molins et al. | 156/519 |
| 3,577,293 | 5/1971 | Ritterhoff | 156/521 |
| 4,017,349 | 4/1977 | De Priest et al. | 156/361 |
| 4,019,935 | 4/1977 | Harvey | 156/361 |
| 4,100,012 | 7/1978 | Miehofer | 156/361 X |

*Primary Examiner*—Michael G. Wityshyn
*Attorney, Agent, or Firm*—Sim & McBurney

[57] ABSTRACT

There is provided a combination of a web-treating apparatus adapted to feed web at a steady rate into a web-handling apparatus, the latter performing an operation on the web, such as stamping. In the latter apparatus, the web is entrained over a series of rollers which include parallelogram -linked rollers set in such a way that web can be continuously and steadily fed into the web-handling apparatus and out of it, while at the same time the web can be halted intermittently at a portion of the apparatus at which the operation is to be carried out. As the web stops and starts at the location where the operation is carried out, the parallelogram-linked rollers move back and forth in an arc. In order to match the averaged speed of the web past the location where the operation is taking place to the infeed of web to the web-handling apparatus, a potentiometer is applied to the parallelogram-linkage, such that if the arc through which the parallelogram is moving progressively shifts in one direction or the other beyond a given pair of limits, the potentiometer setting will be changed. The potentiometer is wired into the control means which governs the overall or averaged speed of the web past the location where the operation is being performed.

5 Claims, 10 Drawing Figures

PRINTING AND DIE-CUTTING APPARATUS

This invention relates generally to printing and die-cutting apparatus adapted to operate on a continuous web which has releasably adhered to one side a label forming layer. The layer is normally severed by the die-cutting portion of the apparatus into a plurality of labels which are aligned with the printed material on the layer, and after the die-cutting operation the layer defines, intermediate the plurality of labels, an integral "ladder" as it is called, the ladder requiring stripping from the web before the web is formed into a roll.

Printing and die-cutting apparatus of this kind conventionally involves a number of shortcomings and problems, several of which are overcome by the modifications and improvements disclosed and claimed herein.

One of the problems with conventional equipment of this kind relates to the operation of stripping the integral ladder from between the die-cut labels on the web, to allow the labels to remain adhered to the web as the latter is carried on further and wrapped around a mandrel to form a roll. When the labels stamped on the layer adhered to the web are particularly close together, the ladder which results is constructed of extremely thin segments which are very flimsy and easily broken. In many cases it is found that an attempt to separate the ladder from the labels and the web by pulling it directly upwardly so that the line of separation is perpendicular to the direction of web movement tends to place undue strain on the various portions of the ladder, with the result that the ladder very often breaks which then requires that the entire apparatus be shut down so that the broken-off edge of the ladder can be restrung through the various rollers which are intended to lead it to its own wind-up mandrel. It has now been discovered that, when the ladder is pulled away from the web in such a way that the line of separation is oblique to the direction of web movement rather than perpendicular thereto, the tendency for the ladder to break or become ruptured is very much reduced. If an attempt to utilize this discovery is made by simply providing a bend or take-off roller angled across the web and in contact with it, such that the ladder can be lifted up around the downstream side of that bend roller, a further problem arises in disposing of the ladder which of course comes off the bend roller in an oblique configuration. The problem is how to bend that oblique configuration back to something which is parallel or transverse to the main lines of the apparatus. If this is not done, then it will necessitate a whole series of rollers and wind-up mandrels also oblique to the apparatus. While such construction could be made, it would lack a certain amount of variability, because it has been discovered that ladders of particular material and particular construction respond better to one angle than to another. It is thus highly desirable to be able to selectively vary the angle along which the ladder is lifted away from the web, and an aspect of this invention is to provide structure which permits such selective variation while permitting both the ladder and the remainder of the web to track straight through the apparatus in such a way that no permanently oblique rollers or mandrels need to be provided.

More specifically, this disclosure describes, in a label die-cutting apparatus for operating on a supporting web that has releasably adhered to its upper side a label-forming layer which is severed by the die-cutting into a plurality of labels and an integral ladder which requires stripping from the web before the latter is formed into a roll, the improvement which comprises:

an offsetting pair of parallel rollers mounted on a sub-frame adapted to pivot with respect to the direction of web movement so that the aligned axes of the parallel rollers can form angles other than a right angle with the direction of web movement while remaining parallel with the plane of the web, the offsetting pair including a first roller whose upper surface lies in the web plane so that the web can bend over and downwardly around the first roller, and a second roller wholly below the web plane adjacent the first roller so that the web can pass around and underneath the second roller, from where the web can proceed again in its original direction, and means to lock the sub-frame in a desired angular orientation with respect to the web direction, a take-off roller downstream of the offsetting pair and mounted for free rotation on an axis transverse to the web movement, the take-off roller being positioned so that the plane of web movement, if extended, would be roughly tangent to the lower surface of the take-off roller, whereby the ladder can be entrained around the take-off roller, and a wind-up roller adapted to receive and wind up the ladder entrained around the take-off roller, with means for applying a positive winding torque on the wind-up roller.

Further problems with the conventional apparatus relate to the problem of obtaining proper registry between printing on the layer adhered to the web, and the die which achieves the cutting of the layer (without severing the web). This invention provides an apparatus of which one aspect is to permit selective variation of the registry between the web and the cutting die over a continuous range, and also to permit this selective adjustment while the apparatus is operating.

Another difficulty encountered in conventional apparatus relates to the way in which the web is normally printed and the matching or dove-tailing of this conventional printing method with the least expensive of the ways to accomplish the die-cutting operation. The normal method of printing is on a continuous basis, with the web being unrolled from a supply roll at a speed which may be adjusted, but which when adjusted remains constant. The least expensive method of die-cutting is to use a vertically reciprocating die-cutting plate, often referred to as a steel rule die, which is caused to move up and down against a back-up plate, with the web moving intermittently past the die-cutting plate. The web is of course stationary during the actual cutting, and moves only when the die-cutting plate has risen upwardly away from the web. Thus, the least expensive die-cutting method involves intermittent web motion, whereas the most common printing method involves continuous web movement. It is an aspect of this invention to provide a die-cutting apparatus which is adapted to receive web at a continuous speed rate, but which is able to cause the web to undergo intermittent motion past the die-cutting plate, while allowing a continuous feed of the web away from the die-cutting portion of the apparatus in the downstream direction. This allows continuous winding up of the die-cut and printed web and avoids the inertial difficulties related to stop-start motion. It is a further aspect of this invention to provide an automatic adjustment feature which will, by a feedback system, automatically and continuously adjust the overall rate of web movement past the die-cutter (i.e.

the time-averaged speed) to make it exactly match the speed of web delivery to the apparatus. In this way, the die-cutting apparatus can be utilized with any standard form of printing apparatus which feeds out printed web at a constant speed.

Also disclosed herein is a novel means of allowing axial reciprocation of certain of the rollers in an inking train of rollers, such that the moveable rollers can reciprocate back and forth to help spread the ink evenly over the length of each roller. The feature under discussion is also adjustable to allow a selection of the total displacement of the axially shifting rollers continuously from a zero shift up to a maximum.

Further disclosed herein is an improvement relating to the fountain blade which defines with the fountain roll a niche or V-shaped container for the ink. The fountain blade has one edge closely adjacent the fountain roll, and it is conventional practice to provide a plurality of adjustable threaded means in side-by-side relationship under the blade along the length of the fountain roll, the threaded means having a portion bearing upwardly against the margin of the fountain blade which is closest to the fountain roll. This allows a selective adjustment of the spacing between the adjacent edge of the blade and the fountain roll itself, so that a variable amount of ink can be picked up by the fountain roll: i.e. the fountain roll can have a smaller amount of ink at some locations than at others, in order to adjust itself to a printing pattern which also requires less ink in certain locations. Described herein is constructional feature related to the threaded means, by which the sensitivity of the threaded means is greatly increased. In other words, the change in spacing between the blade edge and the fountain roll is very slight for a given degree of rotation of a given one of the threaded means, as compared to conventional constructions.

Another feature also relates to the plurality of the various rollers involved in the printing process. Normally, the web is printed by passing between an impression roll and what is called a plate roll. The plate roll has wrapped around it a sheet or layer which contains the particular printing pattern in relief. The web passes between the impression and the plate rollers with its side-to-be-printed facing the pattern wrapped around the plate roll. The plate roller is fed ink by one or more series of what are called form rolls, and each series ultimately derives its ink from the fountain roll discussed previously. In conventional constructions, the plate roll and the impression roll are exactly geared together so that they always rotate in such a way that their surface speeds are identical. However, because the thickness of the impression-carrying layer on the plate roll can vary, it is considered necessary to allow for a slight adjustment in the axial spacing between the plate and impression rolls, and of course this will allow for a greater or lesser degree of play in the engaging teeth of the gears which are associated with these two rolls. Because of this amount of play, and because one of these rolls in effect drives the other, it can happen that, upon a change of speed, or upon starting or stopping of web movement, there is a distinct amount of "slip" of the one with respect to the other, representing the amount of play between the gears. This causes on the web what are known as "gear marks", and the latter constitute flaws in the inking procedure which normally have to be rejected.

In order to remove this problem relating to gear marks, it is provided that the plate roll and the impression roll be driven separately, and that the relative peripheral speeds of these two rolls be adjustable over a certain range on either side of the point of exact match. The latter feature allows the inked impression on the web to be shortened or lengthened in the axial direction of web movement. This will help to compensate for the situation which can arise when the relieved layer wrapped around the plate roll happens to be thicker or thinner than normal. Where some deviation in thickness is encountered, the outer perimeter of this layer will be different from that which might be expected, and the inked image on the web will be either longer or shorter than expected, in the axial direction of web movement. Where the die-cutting procedure involves the use of a die-cutting plate dimensioned on a particular assumption of print size, the deviation caused by the off-thickness of the layer wrapped around the plate roll can cause serious problems of registry. By making the plate and impression roller separately driven and by having the speed of the one with respect to the other continuously and selectively variable, it is possible to compensate for the problem just described.

Finally, described herein is a feature relating specifically to the ink-transferring form rolls which carry the ink from the fountain roll described earlier to the plate roll described above. The particular arrangement of rolls described in this invention involve a first or primary train of form rolls which are serially in contact and of which the final or downstream form is in contact with the plate roll, and a secondary train of form rolls which includes an upstream roll in contact with one of the rolls in the primary train, and a downstream roll in contact with the plate roll at another location around the periphery of the latter. It is desirable to be able to adjust the primary train and the secondary train independently of each other in terms of the distribution of ink transferred to the plate roll along the axial length of the plate roll. For this reason, it is desirable to be able to break the contact of one train while adjusting the ink distribution characteristics of the other train. This invention provides a means of selectively and independently breaking the contacts between each of the trains and the plate roll, so that such adjustment can be carried out.

In the accompanying drawings the several features and components of this invention are illustrated in detail, and like numerals denote like parts throughout the several views. In the drawings.

Figure 1:
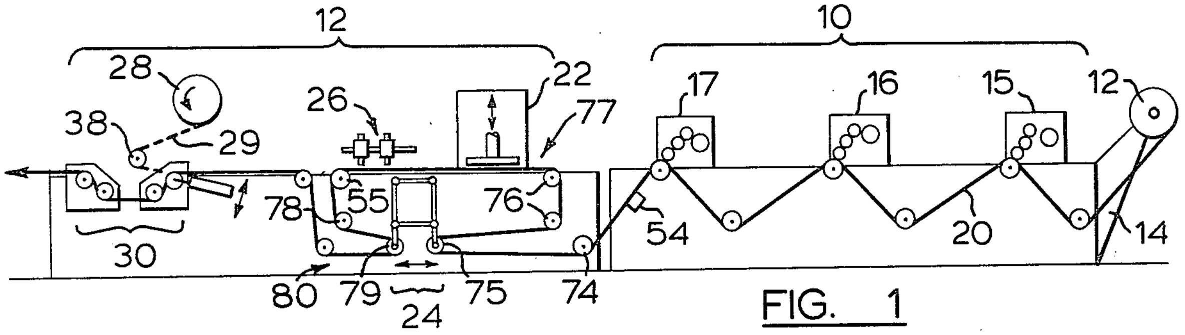
FIG. 1 is an elevational, schematic view of the major components of an apparatus constructed in accordance with this invention.

Turning first to FIG. 1, this invention is seen to include in general a printing section 10 and a die-cutting section 12. The printing section 10 includes a feed roll 12 adapted to feed a continuous web into the printing section 10 to be printed, the roll 12 being mounted on supporting structure 14. The printing section 10 includes, in the embodiment shown, three printing stations 15, 16 and 17, which receive the web in sequence, and which may be adapted to print up to three colours on a single web, in order to provide multi-colour prints. In some cases, only one or two of the stations 15–17 would be utilized, depending upon the application. From the printing section 10 the web 20 proceeds to the die-cutting section 12. The die-cutting section 12 includes a die-cutting station 22, a structure 24 allowing the web to be received continuously from the printing section 10 but to move intermittently past the die-cutting station 22, structure 26 allowing adjustment of the web in its stopped condition with respect to the plate in the die-cutting station 22, a wind-up roll 28 for the ladder 29, and structure 30 which allows the line along which the ladder 29 is pulled away from the web proper to be selectively angled with respect to the main feed direction of the web 20.

Figure 2:
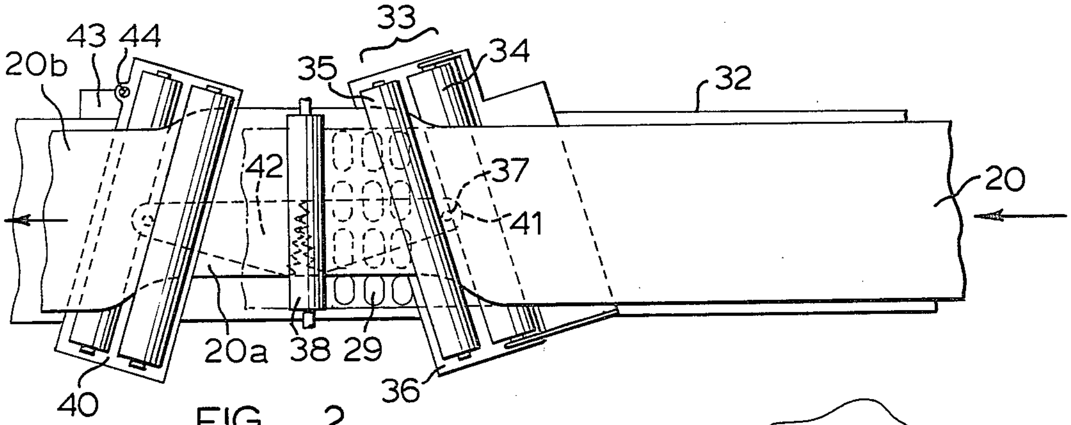
FIG. 2 is a plan view of one portion of the apparatus shown in FIG. 1.

Turning now to FIG. 2, there is seen in greater detail the structure 30 briefly mentioned above. The numeral 32 identifies the basic outer margins of the die-cutting section 12 of the apparatus of this invention, and the web 20 is seen moving from right to left in FIG. 2.

As mentioned in the preamble to this specification, the die-cutting station 22 delivers the web in a condition in which the print-carrier layer adhered to the web is severed into a plurality of labels and an integral ladder consisting of the portion of the printed layer which is intermediate or interstitial with respect to the labels. The ladder 29 must be pulled away from the web before the web with the labels still remaining adhered to it is wound up into a roll for delivery to the end user.

Looking specifically at FIG. 2, there is provided an offsetting pair 33 of parallel rollers, the rollers being identified by the numerals 34 and 35, and being mounted on a sub-frame 36 which is adapted to pivot about a point 37 with respect to the remainder of the apparatus, and with respect to the direction of web movement. Through this pivoting action of the sub-frame 36, the aligned axes of the parallel rollers 34 and 35 can form angles other than a right angle with the direction of web movement, while remaining parallel with the plane of the web. In other words, the parrallel rollers 34 and 35 have their axes always horizontal, and the web 20 itself remains horizontal in the particular embodiment illustrated. The first roller 34 has its upper surface lying in the web plane so that the web 20 can bend over and downwardly around the first roller 34 and under the second roller 35. The second roller lies wholly below the web plane and is adjacent the first roller. Since the two rollers are parallel, the web upon emerging from contact with the roller 35 proceeds again in its original direction, but is offset from its original position both in the vertical sense and in the horizontal sense. In other words, looking at FIG. 2, the part 20A of the web 20 which is proceeding from beneath the second roller 35 lies in a plane which is displaced below the original plane of the web 20, and is also offset laterally to the right, when viewing web motion along the direction in which the web is moving.

The ladder 29 is shown in broken lines in FIG. 2 as continuing substantially in the original plane of web movement to and around a roller 38 which is freely rotatable about an axis which is horizontal and transverse to the direction of web movement. From the roller 38 the ladder 29 proceeds to the wind-up roll 28 which is pictured in FIG. 1 but which is not shown in FIG. 2 in order to avoid cluttering the drawing.

It will thus be seen that the particular angulation of the sub-frame 36 will be identical to the angulation of the line at which the ladder 29 is withdrawn from the remainder of the web 20. This separation along an angulated line takes place despite the fact that the ladder 29 itself continues on in the same plane while it is the web which is bent downwardly away from the ladder. The question of which of these is bent has little to do with the reliability of the procedure in terms of reducing the risk of rupturing the ladder.

The particular embodiment of this invention illustrated in FIGS. 1 and 2 includes a second sub-frame 40 which is downstream of the first mentioned sub-frame 36 and which contains a further offsetting pair of parallel rollers which are mirror-image reversed from the first mentioned pair about a hypothetical vertical plane between them transverse to the web movement. In other words, the angle defined by each sub-frame to the direction of web movement is the same as the angle defined by the other, except that the angulation is symmetrical about an intermediate transverse plane. By having the web portion identified by the numeral 20A pass upwardly through the second sub-frame 40 and its parallel rollers in the exact same manner as it passed downwardly through the first pair, the web will be restored at 20B to a positional location in which it is exactly aligned with its original location before entering the sub-frames 36 and 40. This exact alignment of the web before entering the structure 30 with the web after leaving the structure 30 means that no further provision need to be made downstream of the structure 30 to compensate for any offset that occurs in the structure 30. Furthermore, the roll 38 and the wind-up roll 28 for the ladder 29 will remain in the same position and unaltered regardless of the degree of angulation of the two sub-frames 36 and 40.

Interlocking means are provided for tying together the pivotal movements of the two sub-frames 36 and 40 such that, at any setting, each defines the same angle with respect to the hypothetical vertical transverse plane between them, and this of course ensures that the web, after traversing the two sub-frames 36 and 40, ends up travelling in substantial alignment with its movement upstream of the sub-frames. The particular interlocking means preferred in the invention as illustrated involves two partial gear portions 41 and 42 secured respectively to the sub-frames 36 and 40 on a plane below the lowest plane of web movement.

Locking means are provided for locking the sub-frames 36 and 40 into a given angular setting, and in the apparatus illustrated such means includes a plate 43 affixed to the frame of the apparatus, and a threaded member 44 threaded into the sub-frame 40 and adapted to bear downwardly against the plate 43 sufficiently to lock the sub-frame 40 (and thus the sub-frame 36) into a given angular position.

Figure 3:
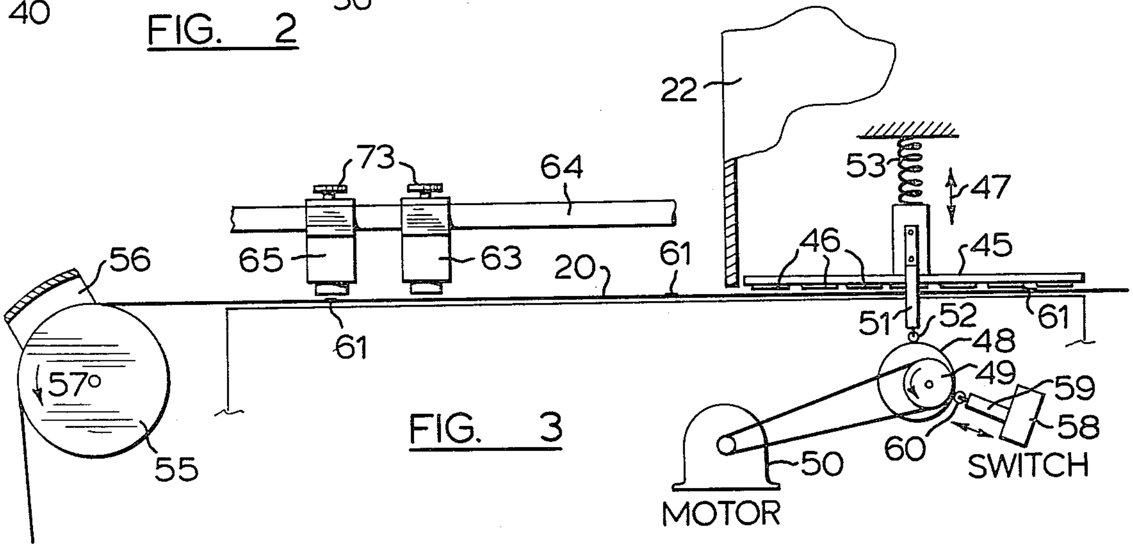
FIG. 3 is a partly broken away elevational view of other components of the apparatus of this invention, relating to the matching of the web to the die-cutting plate.

Attention is now directed to FIG. 3, which shows, in somewhat schematic form, the essential components of the die-cutting station 22. The station itself is shown in partly broken away fashion, and is seen to contain the die-cutting plate 45 supporting the individual dies 46 on its undersurface, and being adapted to reciprocate vertically as shown by the arrow 47. In this drawing, the movement of the die-cutting plate 45 is controlled by an eccentric cam 48 rotating on a shaft 49 which is driven by a motor 50. A follower arm 51 has a follower wheel 52 at the lower end in contact with the eccentric cam 48, and the follower arm 51 is fixed with respect to the die-cutting plate 45 to move in tandem therewith. The die-cutting plate 45 is constrained to move upwardly and downwardly, and a spring means 53 urges the plate 45 downwardly to its lowermost position, as determined by contact between the follower wheel 52 and the surface of the cam 48. The speed of the motor 50 is variably controlled by the voltage output from a tachometer 54 (FIG. 1) which responds to the speed of web movement. The electronic means which converts the voltage signal from the tachometer 54 into instructions for the speed of the motor 50 is conventional and need not be shown or described in detail.

In the condition of the various components shown in FIG. 3, the die-cutting plate 45 is in the midst of its downward movement toward the web 20, and at the lower end of that movement the severing of the uppermost layer adhered to the underlying web will take place, resulting in the individual labels and the interstitial ladder. The web 20 is in the stopped condition in FIG. 3, having just been brought to a stop by a process which is now to be described.

It has been stated that the web movement through the die-cutting station 22 is an intermittent one. The particular drive roller which pulls the web along and through the die-cutting station 22 is shown by the numeral 55, and can be seen in both FIG. 1 and FIG. 3. The drive roller 55 is powered by a low-inertia direct-drive motor 56 which is mounted to the frame, and which is adapted to drive the roller 55 in the direction shown by the arrow 57. The motor 56 is adapted to take up one of three states on command. These states are: fully off, maximum speed, and very slow speed. Relays and other switching means are provided (not shown) for controlling the low-inertia motor 56 at particular times during the 360° cycle represented by one rotation of the shaft 49 in FIG. 3. A switch 58 supports an extensible and retractible follower arm 59 having a follower wheel 60 on the end, which also is adapted to bear against the outer surface of the eccentric cam 48. In the situation pictured in FIG. 3, the motor 56 is off, and the web 20 is standing still, as already stated. The switch 58 is adapted to switch the low-inertia motor 56 to is maximum speed mode, and this happens when the follower arm 59 is pushed to its furthest away position with respect to the shaft 49. This would occur about 180° further on from the position pictured in FIG. 3. Between the FIG. 3 position and the 180° displacement position which initiates the maximum-speed rotation of the low-inertia motor 56, the die-cutting plate 45 will have descended to cut the layer that has been printed and will have begun to rise along its upward motion. The position of the switch 58 and the follower wheel 60 is located such that the switch will instruct the low-inertia motor 56 to go into its maximum-speed mode just as the die-cutting plate 45 rises clear of the web 20. This is necessary, of course, so that the die-cutting plate 45 does not interfere with the rapid forward motion of the web 20.

We come next to the means by which the motor 56 is instructed to stop the forward motion of the web. It will be understood that the stopping of this forward motion will have to be arranged so that the steel-rule dies 46 on the underside of the die-cutting plate 45 are exactly aligned with the printed images. To allow such alignment, the web (or actually the print-receiving layer which is above and adhered to the web) has applied to it, at intervals, a series of register marks 61 which are spaced apart by a distance equal to the repeat distance of the print, which would be the same as the length of the die-cutting plate 45 in the direction of web movement. The register marks 61 would be placed along the margin of the web, although other positions could be utilized. The difficulty with utilizing non-marginal positions would be related to possibly interfering with the pattern of printed labels.

The signal to the low-inertia motor 56 to go from its high-speed mode into its low-speed mode is given when one of the register marks 61 passes beneath a light-sensing device 63 which is selectively and longitidinally adjustable along a carrier bar 64 which is fixed with respect to the remainder of the apparatus (the means fixing the bar 64 not being shown in FIG. 3). The particular construction of the photo sensor components of the device 63 are conventional, and do not need to be described or shown in detail in this specification. Thus, very shortly after a register mark 61 passes leftwardly underneath the device 63, its speed will have slowed down considerably, and will be little more than a creep. Downstream of the device 63 is another similar device 65 which is also selectively and longitudinally adjustable with respect to the bar 64, and which is adapted, upon sensing the presence of a register mark 61, to instruct the low-inertia motor 56 to stop entirely. This will bring the web 20 to a halt with the register mark 61 in the location in which it is drawn in FIG. 3, namely directly beneath the device 65.

Figure 4:
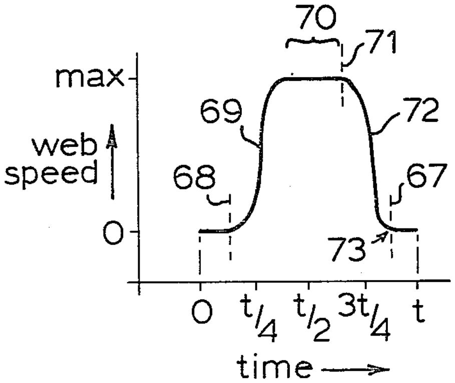
FIG. 4 is a graph useful in explaining the intermittent motion of the web caused in the die-cutting portion of this apparatus.

Turning to FIG. 4, the resultant motion of the web is pictured in graphical form. The distance on the horizontal axis from zero to t represents one whole rotation of the shaft 49 and the cam 48 which is affixed thereto. Thus, the time t/4 can be equated to 90° of motion, t/2 can be equated to 180° of motion, etc.

On the vertical axis the web speed is shown measuring from 0 speed, or stopped, to the maximum speed. The position of the components shown in FIG. 3 is represented by the dotted line 67 in FIG. 4, because the web has just been brought to a halt and the die-cutting plate 45 is about to descend and sever the labels. Thus the speed of the web to the right of the dotted line 67 is at 0. The cycle then repeats which takes the speed line back to the 0 position on the horizontal axis. Up to the time point (or angle point if it is desired to consider it in that way) identified by the line 68, the web remains stationary, and the severing takes place. The point of maximum sever can be assumed to occur at time 0. However, when the line 68 is reached, the switch 58 is thrown and instructs the low-inertia motor 56 to immediately take the web 20 up to its maximum speed. This it does along the portion 69 of the graph of 54, quickly reaching the maximum speed. It remains at the maximum speed over the distance represented by the bracket 70, and at the dotted line 71 the motor 56 receives the signal to slow down from the maximum speed to the low-speed mode. Thus, the line 71 represents the signal given by the device 63 as a register mark 61 passes beneath it. The motor thus slows down over the portion of the graph represented by the line 72, and is just beginning its lowest speed mode 73 when the register mark 61 passes beneath the second or downstream device 65 which signals the motor 56 to stop entirely. This completes the cycle, which then repeats on a continuous basis.

Both of the devices 63 and 65 are adjustable by means of locking bolts 73 with respect to the bar 64, and this means that the bolts 73 can be loosened by hand so that each device 63, 65 can be adjusted. It will be understood that, once the particular characteristics of the motor 56 with respect to the weight of the web are known, it may be possible to fix the spacing between the devices 63 and 65 so that this is unchanging, because this will mean that only a single adjustment will have to be made in order to adjust the registry between the die-cutting plate 45 and the web 20.

Figure 5:
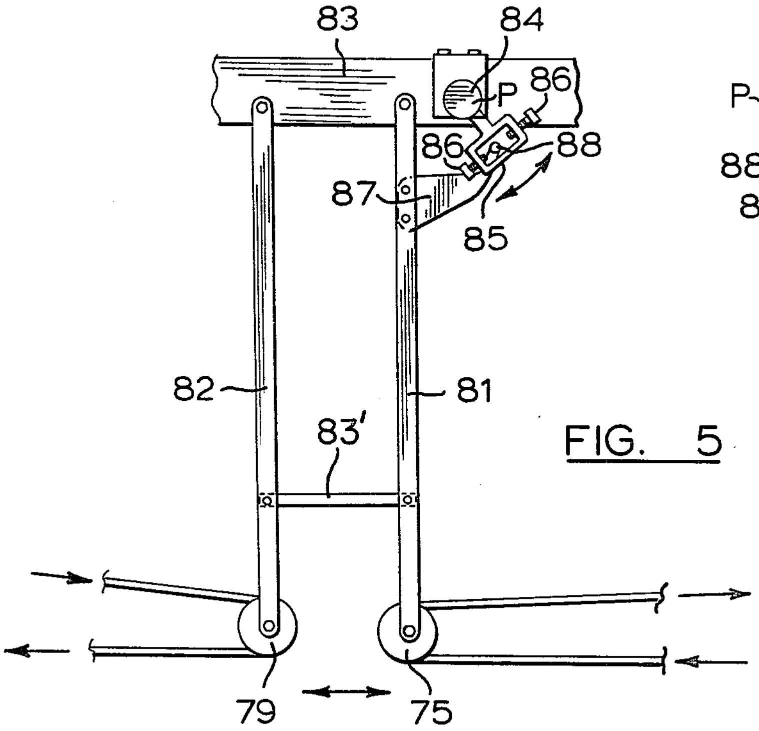
FIGS. 5 and 6 are elevational and transverse sectional views of the portion of the apparatus which allows the die-cutting portion to receive web on a continuous basis.
Figure 6:
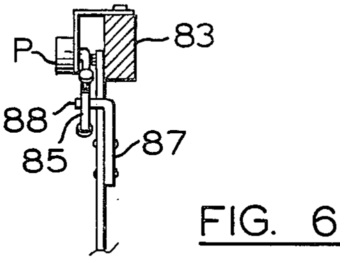

Attention is now directed to FIGS. 5 and 6, which show in greater detail the structure 24 which was identified in FIG. 1 as being that responsible for allowing the web 20 to be moved intermittently past the die-cutting station 22, while being fed on a continuous basis from the printing section 10.

As can be seen in FIG. 1, the web 20 upon emerging from the printing section 10 is passed first around an idler roller 74, thence in the general direction of web advancement in a plane substantially parallel with but spaced vertically below the die-cutting plane to a first displaceable roller 75, thence around the first displaceable roller 75 and back in the reverse direction, thence around guide rollers 76 to the upstream end 77 of the die-cutting plane, thence in the advance direction along the die-cutting plane and through the die-cutting station 22, thence around the positively driven drive roller 55 which controls the web movement along the die-cutting plane, thence around a guide roller 78 and again in the reverse direction substantially aligned with the first reverse described above, thence around a second displaceable roller 79 spaced downstream of the first displaceable roller 75, and thence forwardly again along the region 80. As can be seen in both FIGS. 1 and 3, the first and second displaceable rollers 75 and 79 are tied together so that the spacing between their axes remains constant, but in such a way that both are displaceable in tandem in the downstream and upstream directions in order to allow the web to feed at a constant speed from the printing section 10 but to undergo stop-start motion in the die-cutting section 12. The tying together of the roller 75 and 79 is carried out by virtue of a parallelogram linkage which includes two vertical arms 81 and 82, each of which is pivoted at the top to a member 83 of the general frame of the apparatus. The two vertical arms 81 and 82 are tied together by a cross link 83′ which is pivotally connected at either end to intermediate locations on the vertical arms 81 and 82. At the lowermost ends of the arms 81 and 82 are pivoted the axes of the displaceable rollers 75 and 79. It can be seen that, since both of the members 81 and 82 are pivotally attached to the link 83′, and since the intermediate link 83′ is the same length as the spacing between the upper ends of the arms 81 and 82, a parallelogram linkage is defined which will ensure that, at all times, the distance between the axes of the displaceable rollers 75 and 79 will remain constant.

It will thus be appreciated that as the web 20 feeds continuously at a steady speed from the printing section 10 around the roller 74, whenever the web is at a standstill in the die-cutting plane of the section 12, the parallelogram linkage will shift its lower end to the left (clockwise motion) to allow the additional web material to be absorbed or taken up. Then, as soon as the motor 56 initiates high-speed advance of the web along the die-cutting plane, the speed of which is greater than the continuous feeding speed from the printing section 10, the web will be taken off the displaceable roller 75 at a greater speed than it is being fed to that roller, which will suddenly pull the parallelogram linkage back to the right in the counter-clockwise direction. Counter-cockwise movement of the parallelogram linkage will stop when the web advance is arrested, and the cycle will then repeat.

It will be appreciated that, if the overall averaged speed of web movement on an intermittent basis past the die-cutting station 22 does not exactly match the continuous speed of web feed from the printing section 10, the discrepancy will gradually build up and will cause the positions of the parallelogram linkage at the ends of its arc of movement to gradually shift either in the clockwise direction (if the continuous feed exceeds the averaged intermittent speed), or in the counter-clockwise direction (if the continuous feed of web from the printing section is the lesser of the two).

It has been stated above that the speed of the motor 50 which controls the cycling of the die-cutting plate and thus the cycling of the intermittent motion of the web along the die-cutting plane, is controlled by the voltage output from a tachometer 54. It will also be appreciated that an exact calibrated matching of the output voltage from the tachometer 54 in order to ensure that the averaged web speed in section 12 will exactly match the continuous web speed in the printing section 10 will be very difficult to achieve. This invention overcomes the problem by providing a continuous feedback system which monitors the position of the arc through which the parallelogram linkage moves, and which causes the motor 50 either to speed up or slow down as the necessity may arise. This system is illustrated in FIG. 5, and includes a potentiometer 84 which constitutes a variable resistance placed in series with the voltage output of the tachometer 54, and thus being adapted to affect the instruction given to the motor 50 by the voltage output of the tachometer 54. Attached to the setting arm of the potentiometer 84 is a lost-motion arrangement which includes a substantially rectangular frame 85 having setting screws 86 in either end so as to decrease or increase the effective space within the frame 85, and an arm 87 securely attached to the vertical member 81 of the parallelogram linkage, the arm 87 having a finger 88 which projects through the "window" defined by the frame 85. The continuous adjustability of the screws 86 will allow the finger 88 to move through an adjustable arc with respect to the frame 85 before it comes into contact with one of the screws 86. By adjusting the screws, the free arcuate movement of the finger 88 without changing the setting of the potentiometer 84 can be determined. If the parallelogram linkage begins to creep in the counter-clockwise direction, the finger 88 will begin to touch and push against the rightward setting screw 86 each time the parallelogram linkage reaches its furthest counter-clockwise position in its arc, this will shift the setting arm of the potentiometer 84 in the counter-clockwise direction, and it is intended that the potentiometer 84 be wired into the voltage output of the tachometer 54 in such a way that such counter-clockwise adjustment of the potentiometer 84 will shift the voltage "seen" by the motor 50 in such a way as to change the speed of the shaft 49 such that the parallelogram linkage's arc of movement will be restored to what it was originally before it shifted away. Similarly, a shift in the counter-clockwise direction would also produce its own corrective measure.

Figure 9:
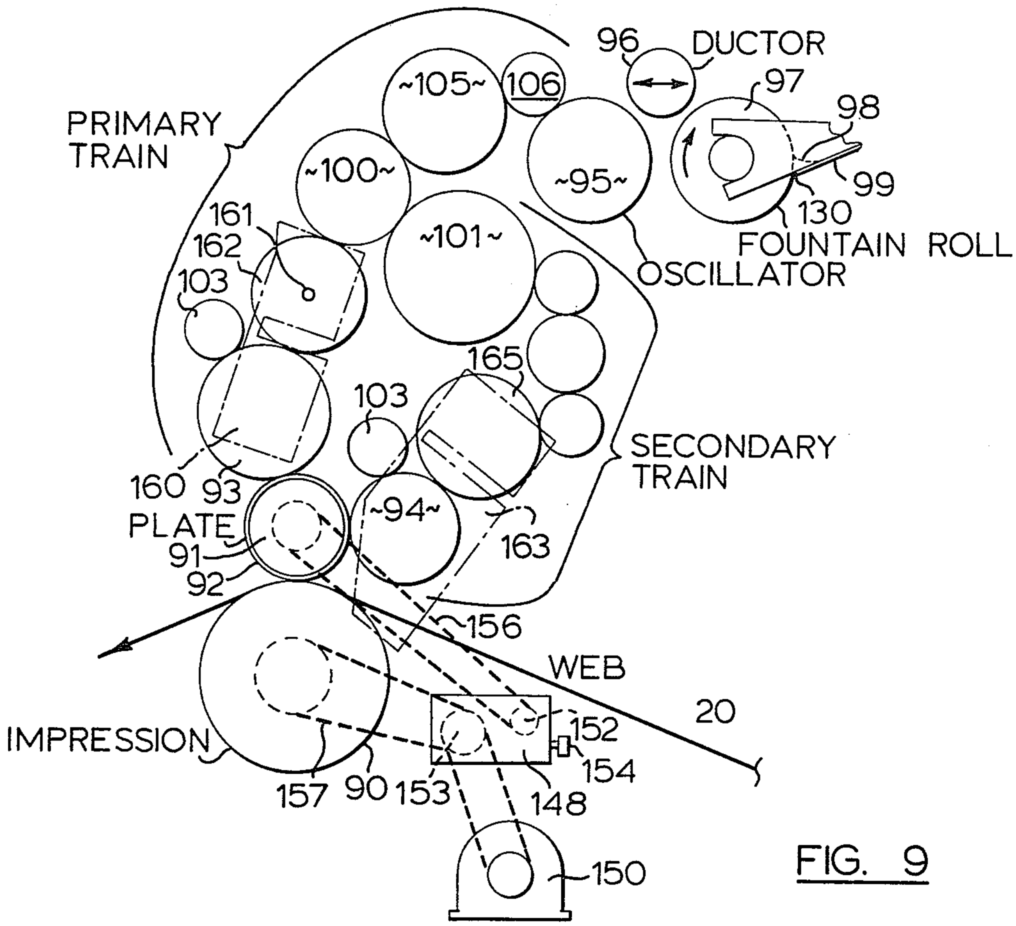
FIG. 9 is a schematic elevational view of the two-train inking roller system associated with the web printing.

Attention is now directed briefly to FIG. 9 which shows a particular arrangement of form rolls and other major cylinders in the printing process. The particular arrangement shown in FIG. 9 would be found within each one of the stations 15, 16 and 17 of FIG. 1, in the preferred embodiment.

At the lower end of this sequence of rollers shown in FIG. 9 is an impression cylinder 90 over which the web 20 is entrained. In pressure contact with roughly the uppermost point of the web 20 as it wraps around a portion of the periphery of the impression cylinder 90 is a plate cylinder 91 which has, around its periphery, a layer 92 which is affixed to the cylinder 91 and which has its outer surface relieved to define the particular printed impression which is to be given to the upper surface of the print-receiving sheet adhered to the web 20. The layer 92 wrapped around the outer surface of the plate cylinder 91 receives ink on a continuous basis from a first roll 93 at one location and from a second from roll 94 at another location. The first form roll 93 is the end roll in a primary train of form rolls which derives ink from an oscillator roll 95, to which ink is transferred by a horizontally reciprocating ductor roll 96. A fountain roll 97 is provided, and it is the fountain roll 97 which first receives a layer or coating of ink from an ink fountain 98 defined between the periphery of the fountain roll 97 and a fountain blade 99 later to be described in greater detail. The ductor roll 96 is adapted to reciprocate between contact with the fountain roll at the rightward end of its travel and contact with the oscillator roll 95 at the leftward end of its contact. Means are provided for causing the ductor roll 96 to contact first one and then the other of these rolls, which means includes an upstanding spring member which supports the ductor roll at its upper end, and which is fixed with respect to the frame at its lower end. At an intermediate location on the spring member, the spring member is gripped by an adjustable arm arrangement having one end secured eccentrically with respect to a continuously rotating shaft. The eccentric mounting ensures that the intermediate point at which the spring member is gripped is caused to move first to the right and then to the left, carrying the ductor roll 96 rightwardly and leftwardly with it. By adjusting the distance between the gripping point for the spring and the eccentric mounting location, the ductor roll can be made to spend a greater portion of its time against one roll than the other, the choice being selectively variable if the distance adjustment is also selectively and continuously variable.

The sequence of ink transfer thus begins with the fountain roll which picks up ink from the ink reservoir 98. The ink is transferred to the oscillator roll by the ductor roll 96, and from the oscillator roll 95 the ink passes down the primary train to the first form roll 93. An intermediate form roll 100 is contacted not only by the rolls upstream and downstream of itself in the primary train, but also by a further form roll 101 which takes some ink off the form roll 100. The form roll 101 is the first or upstream roll in a secondary train of form rolls which ends at the second form roll 94. Ink-smoothing rolls 103 are provided to bear against the first and second form rolls 93 and 94 at locations separated from the main trains, and these are known in the art as "transfer rollers".

The feature of this invention now to be described relates to the desirability of arranging for at least some of the form rolls in the primary and secondary trains to oscillate axially with respect to the remainder of the rollers, in order to help spread the ink smoothly and uniformly across the various rollers. It may be assumed, for example, that the form roll identified by the numeral 105 is to oscillate axially so that its location of contact with roll 100 and with roll 106 is a sliding contact. This may be accomplished in the present invention by affixing a wobble plate in relation to the shaft of form roll 101, which is assumed to be positively driven. The particular construction may be more readily seen in FIG. 7, to which attention is now directed.

Figure 7:
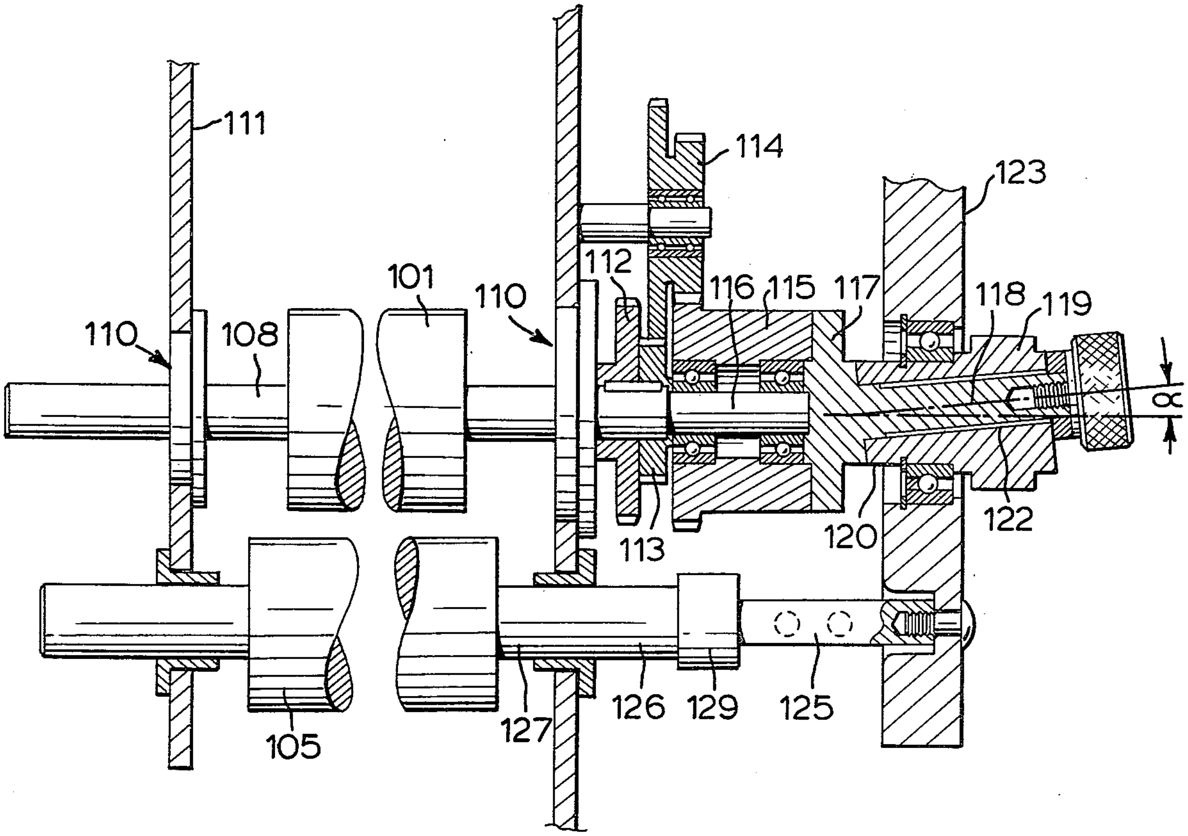
FIG. 7 is a transverse sectional view of a portion of the apparatus relating to the inking rolls.

In FIG. 7, the form roll 101 is shown mounted on its own shaft 108, and journaled at 110 to structural members 111 which form part of the frame of the apparatus. A gear 112 is shown keyed to the shaft 108, and it is the gear 112 through which positive driving power is transferred to the shaft 108 and thus to the form roll 101.

Also keyed to the shaft 108 is a sun gear 113 the teeth of which engage the large-diameter circumference of a double planetary gear 114, the smaller component of which engages an idler gear 115 which is mounted for free rotation with respect to the portion 116 of the shaft 108. The idler gear 115 is axially elongated as shown to encompass appropriate ball-bearing means, and has affixed to its rightward end a base plate 117 from which rightwardly extends a cylindrical stub 118 which projects in the same general direction as the shaft 108 but which is angled therefrom through a specific angle $\alpha$.

An adjustable sleeve 119 is mounted on said stub such that it can be rotationally adjusted with respect to the stub, and can be fixed with respect to the stub at various selectable rotational orientations. The sleeve 119 includes an outer cylindrical surface 120 which is of greater diameter than the stub 118, and it will be seen that, in the orientation shown in FIG. 7, the cylindrical surface 120 is parallel with the shaft 108. This means that the angle of the inner bore 122 of the sleeve 119 which receives the stub 118 is oblique to the axis of the outer surface 120 by an angle which is the same as the angle $\alpha$. It is preferred, for reasons which will appear below, that the angular difference between the centre bore 122 and the outer cylindrical surface 120 of the sleeve 119 should be at least as great as the angle $\alpha$.

A wobble plate 123, which may be circular in outline, is mounted on the sleeve 119 about the cylindrical surface 120 so as to be perpendicular to the axis of the surface 120, and so as to permit the sleeve to rotate with respect to the wobble plate 123.

It will be appreciated that, in the condition shown in FIG. 7, the rotation of the shaft 108 will entail the rotation, at a slower speed, of the gear 115 and of the stub 118. Because the sleeve member 119 is oriented in such a way that its outer cylindrical surface 120 is parallel to the axis of the shaft 108, it will be understood that the wobble plate 123 will not wobble, but instead will simply remain in a position in which it is perpendicular to the axis of the shaft 108, as it allows the sleeve member 119 to rotate within it.

However, if the sleeve member 119 should be rotated with respect to the stub 118, the axis of the outer cylindrical surface 120 will progressively become angulated with respect to the centre axis of the shaft 108, and this will of course angulate the wobble plate 123 with respect to the axis of the shaft 108. Then, as the shaft 108 rotates, entailing the rotation at a slower speed of the gear 115 and base plate 117, the sleeve member 119 will be caused to gyrate around causing the wobble plate 123 also to gyrate in the same manner. The extent of the angulation of the wobble plate 123 with respect to the axis of the shaft 108 is strictly dependent upon the relative angular orientation of the sleeve member 119 with respect to the stub 118. These can be aligned, as in FIG. 7, in such a way that the wobble plate 123 remains stationary and does not wobble. Conversely, these can be arranged at any intermediate point up to that which would find the sleeve member 119 180° displaced around from where it is shown in FIG. 7, and this would represent the maximum wobble for the wobble plate 123. Intermediate locations would be locations of greater or lesser wobble.

Toward the periphery of the wobble plate 123 shown in FIG. 7 there is affixed a three-component universal joint connector 125 between the wobble plate and the end 126 of the shaft 127 upon which the form roller 105 is mounted. We have said previously that the form roller 105 is the one which is intended to reciprocate axially with respect to the others. A component 129 is affixed between the shaft 126 and the universal joint means 125 in order to allow the one to rotate with respect to the other. The universal joint means 125 is affixed at its rightward end to the wobble plate 123, and since the latter does not rotate about its axis but merely wobbles, it will be necessary to provide some means such as the component 129 to allow the shaft 127 to rotate with respect to the three-component universal joint means 125.

In the appended claims referring to this particular feature, the expression "main shaft" is intended to refer to the gear 115 and the base plate 117 in combination, since these constitute, in effect, a main shaft which is parallel to the shaft of the form roller 105, and which is positively rotated.

It will thus be understood that, as the wobble plate 123 undergoes its wobbling motion, it will positively force the shaft 127 of the form roller 105 to move leftwardly and rightwardly, thus causing the form roller 105 to slide with respect to the remaining rollers.

Attention is now directed again to FIG. 9, to introduce a further feature of this invention. We have said that the fountain roll 97 provides ink to the form rollers which convey the ink down to the plate cylinder 91. The fountain roll 97 defines an ink reservoir with the fountain blade 99. The fountain blade has a first edge 130 which lies adjacent to the fountain roll 97 and which slopes downwardly toward the edge 130. The fountain blade 99 is mounted at its edge opposite the edge 130 such that the first edge is free of absolute constraint, and such that the first edge if raised from beneath will approach the fountain roll 97 and if lowered will recede from the fountain roll 97. The specific small spacing between the edge 130 of the fountain blade 99 and the roll 97 will determine how much ink from the reservoir defined between them will be allowed to escape between the slot and cling to the surface of the fountain roll. This in turn will determine the rate of ink feed down along the primary and secondary trains of form rollers.

Figure 8:
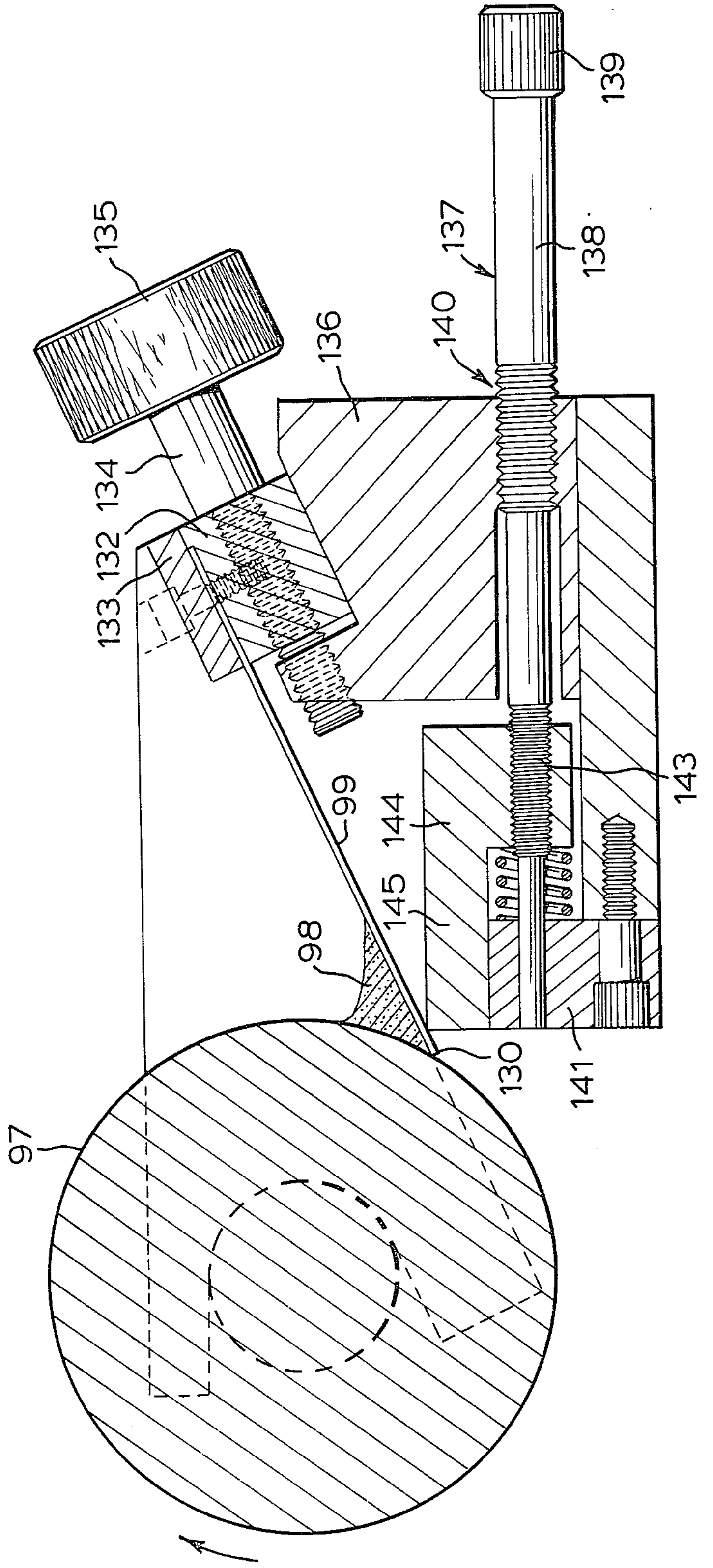
FIG. 8 is a sectional, vertical and longitudinal view, to a larger scale, of a portion of the apparatus adapted to adjust the amount of ink received by the fountain roll.

Attention is now directed to FIG. 8, in which the general disposition of the ink reservoir 98 is clearly seen. The fountain blade 99 can be seen to be secured to a slidable block means 132 by means of a cover plate 133 which is tightened down against the block 132. A shaft 134 with a manual knob 135 passes through the block 132 and is threaded at its leftward end through a threaded bore in a member 136 which may be considered to be fixed with respect to the frame of the apparatus. Thus, adjustment of the knob 135 will cause the fountain blade 99 as a whole to move toward or away from the fountain roll 97, thus providing a gross adjustment of the spacing between the edge 130 and the fountain roll 97. Such gross adjustment, however, is not sufficient for all purposes, because occasionally it is necessary to adjust the amount of ink received on the surface of the fountain roll 97 differentially along its length. This need arises when the printed image on the web draws less ink at certain lateral locations than at others. In this kind of situation it is considered desirable to match the ink flow at the various lateral locations with the ink requirement for the printed image.

In order to carry out such finer adjustment of the spacing of the edge 130 from the periphery of the fountain roll 97, a plurality of side-by-side adjacent keys shown generally by the numeral 137 is provided. Each key 137 consists of a shaft 138 having had its rightward end a manually controllable knob 139. The shaft 138 threadably engages the member 136 at the location 140, and also threadably engages a component 141 which is securely fixed with respect to the member 136. Thus, the threaded engagements at 140 and with the component 141 are fixed with respect to each other. This means that the pitch of the screw threads at both locations must be the same. In the particular embodiment reduced to practice by the applicant a pitch of 1/16" is utilized at these locations (16 threads per inch). More specifically, the engagement at 140 may be a ⅜"×16 thread, whereas the engagement with the block 141 may be a 3/16"×16.

Threadably engaged with an intermediate thread 143 on the shaft 138 is a pressure block 144 which has a leftwardly projecting finger 145 adapted to lie in surface sliding contact with the top of the component 141. The pitch of the thread at the engagement represented by the numeral 143 is slightly smaller than the pitch at 140 and 141, and this yields the considerable advantage that a given rotation of the knob 139, while it will advance the shaft itself with respect to the member 136 over a specific distance determined by the pitch of the threads at 140, will also advance the pressure block 144 but by a much smaller distance. For each full turn of the knob 139, the advance of the pressure block 144 will be equal to the difference in pitch between the threads at 140 and the threads at 143. In actual practice, applicant has utilized at 143 a pitch corresponding to 20 threads per inch, and has specifically used a ¼"×20 thread. This means that one full rotation of the knob 139 will produce a leftward advance of the shaft 138 itself of 1/16", but a leftward advance of the pressure block 144 by an amount equal to 1/16"–1/20" which equals 1/80" or 0.0125". This allows a much finer adjustment of the spacing between the edge 130 of the fountain blade 99 and the fountain roll 97 than would be obtained simply by affixing the pressure block 144 at a given axial location with respect to the shaft 138.

In the initial portion of this specification, a problem was discussed relating to printing flaws which can arise due to "gear marks" resulting from excessive play between the gears normally provided in conventional equipment which lock together the rotation of the plate cylinder and the rotation of the impression cylinder. It has also been pointed out that the strict locking together of the rotary movements of the plate and impression cylinders 91 and 90 results in a lack of versatility in terms of adjusting the axial length of the printed image on the web 20 in order to compensate for stretch or shrink of the image resulting from an off-thickness of the layer 92 which contains the image in relief which is intended to be applied to the web.

This invention provides for the plate and impression cylinders to be independently driven and not keyed together, and also permits a differential adjustment of the relative peripheral speeds of these two cylinders in order to stretch or shrink the image on the web. The web is normally speed-controlled by the peripheral speed of the impression cylinder 90, because the web contacts a much greater surface area of the impression cylinder. Thus, by adjusting the peripheral speed of the plate cylinder 91 with respect to the impression cylinder 90, the movement of the inked image on the layer 91 can be caused to slightly advance or slightly retard with respect to the movement of the web, and this will result in a shrinking or stretching, respectively, of the image printed on the web.

FIG. 9 shows schematically the means for accomplishing this variability. A continuously variable differential component 148 is driven by a motor 150, and in turn drives the impression cylinder 90 at a speed consistently proportional to the rotational speed of the motor 150. The differential component 148 has a further take-off gear or pulley 152, the speed of which may be continuously adjusted with respect to the speed of rotation of pulley 153 over a given range. A knob 154 is provided to allow this adjustability to take place. The pulley 152 directly drives the plate cylinder 91 through a belt 156, while a belt 157 links together the pulley 153 and the impression cylinder 90. The pulleys associated with and fixed with respect to the plate and impression cylinders have been shown in broken lines, as have the various belts by which the power is passed.

Figure 10:
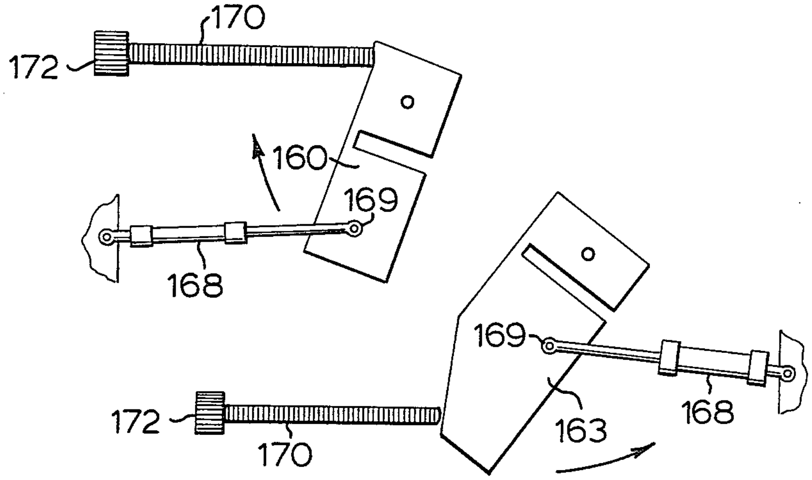
FIG. 10 is a view similar to FIG. 9, showing isolated components in a way which makes their motion clear.

A final feature to be described in this specification is again shown in FIG. 9, and is clarified with the help of FIG. 10. In FIG. 9 it will be seen that the first form roller 93 is mounted to a side plate 160 which is pivoted at the point 161 which is coincident with the axis of the next-in-series form roll 162. It will be understood, of course, that FIG. 9 shows only one side plate 160, and that another identical side plate would be found at the other end of the rollers in exact alignment with the one shown. Both side plates are pivoted at the same location. Since this side plate 160 and its matching plate at the other end are pivoted about the axis of the form roll 162, these can pivot in the clockwise direction from the position seen in FIG. 9, and thus carry the first form roll 93 away from a position of contact with the plate cylinder 91.

In a similar way, a further side plate 163 is provided, to which the second form roll 94 is mounted. The further side plate 163, and a matching plate at the other end of the rolls, is pivotally mounted about the axis of the next-in-series form roll 165 (i.e. the next in series in the secondary train). By pivoting the further side plates 163 in the counter-clockwise direction, the second form roll 94 can be carried rightwardly away from its position of contact with the plate cylinder 91.

FIG. 10 shows the means by which the side plates 160 and 163 can be pivoted, these means including hydraulic cylinders 168 having pistons pivotally affixed at 169 to the side plates, and having the other ends of the cylinders secured to a portion of the frame of the apparatus, shown schematically in the usual way.

Adjustable stop means are provided for fixing the angular positions of the side frames when the two series of rollers are in communication with the plate cylinder 91. In FIG. 10, the stop means is seen to include threaded shafts 170 each having at one end a manually controllable knob 172. The shafts 170 would threadably engage threaded bores in portions of the apparatus located adjacently (not shown).

I claim:

1. In combination:

a web-treating apparatus for treating a continuous web, and from which the web issues at a steady speed, and a web-handling apparatus for performing an operation on said web, the operation requiring the web to be stationary during the operation, the web bearing longitudinally spaced register marks, the web-handling apparatus comprising:

first means for carrying out said operation, second means for positively and periodically advancing the web past said first means when the latter is not acting upon the web, including at least one drive roller positively engaging the web, and control means for positively rotating and braking said at least one drive roller, sensing means mounted adjacent to where the register marks on the web pass, the sensing means being selectively adjustable in the direction of web movement and including an upstream sensor which upon detecting a register mark signals said control means to begin to slow down from its normal web-advance speed, and a downstream sensor which upon detecting a register mark signals said control means to stop the movement of the web, whereby the stopped position of the web with respect to said first means can be adjusted by adjusting the position of said downstream sensor, the web from the web-treating apparatus moving along a path which includes a first leg passing by said first means and in which said operation can be carried out, a second leg upstream of said first leg, said second leg being looped around a first end roller that is displaceable to lengthen and shorten said second leg, a third leg downstream of said first leg, said third leg being looped around a second end roller that is displaceable to lengthen and shorten said third leg, said first and second end rollers being linked together by a swingable, pivoted linkage in such a way that displacement of the first end roller to lengthen its respective leg entails displacement of the second end roller to shorten its respective leg, and vice versa, the web speed issuing from the web-treating apparatus being monitored by an electronic tachometer, the output of which is a voltage which is a function of the input web speed, the pivotal linkage controlling the setting of a potentiometer through a lost-motion arrangement which leaves the potentiometer at a given setting unless the linkage arc begins to shift angularly, such shifting causing a change in the potentiometer setting, the potentiometer being used as a fine-tuning over-ride to control means governing the average web speed along the first leg of the web path in such a way that any wandering of the linkage arc will cause a shift of the potentiometer setting which will change the speed of said last-mentioned means to bring the linkage arc back in the other direction, said control means being responsive to said voltage.

2. The combination claimed in claim 1, in which the potentiometer is wired between the tachometer output voltage and the speed control input of a drive means adapted to cause said first means to carry out said operation on a periodic basis, the repeat time of which is governed by said speed control input, whereby said drive means constitutes said control means.

3. The apparatus claimed in claim 1, in which the web is a supporting web that has releasably adhered to its upper side a printed label-forming layer, the said first means including die-cutting provisions capable of severing the label-forming layer into a plurality of labels and an integral ladder without cutting the supporting web,
  the first means specifically including a die plate adapted to cut a plurality of labels simultaneously, said plurality repeating in step with the register marks,
  anvil means adjacent the die plate, such that the web with the printed layer can pass therebetween,
  and means for causing relative movement between the die plate and the anvil to cause the plate to contact the label-forming layer to sever the same.

4. The apparatus claimed in claim 1, in which the first leg of the path is horizontal, the second leg of the web path including a first portion along which the web passes in a plane substantially parallel with but spaced from the first leg, thence around said first end roller, thence back in the reverse direction substantially parallel with said first portion, thence around guide roller means to the upstream end of said first leg;
  said at least one drive roller being located in the web path between the two end rollers, and in operative contact with the web,
  said third leg involving web movement from the downstream end of the first leg around guide roller means and thence in a direction reversed from web movement in the first leg and substantially aligned with said first portion of the second leg, thence around the second end roller and thence again in the forward direction;
  the first and second end rollers being tied together so that the spacing between their axes remains constant, both being displaceable in tandem in the downstream and upstream directions with respect to web movement in the first leg, in order to allow the web to feed at a constant speed from the web-feeding portion to undergo stop-start motion in the first leg, and to allow the web to feed out of said third leg at constant speed.

5. The apparatus claimed in claim 4, in which the first and second end rollers are mounted at one end of a parallelogram linkage which is pivoted at the other end to a frame portion which is stationary with respect to the first means, whereby the end rollers can swing back and forth through an arc in tandem in the general direction of web movmement along the first leg.

* * * * *